United States Patent
Sehsah et al.

(10) Patent No.: US 10,544,344 B2
(45) Date of Patent: Jan. 28, 2020

(54) METHODS AND SYSTEMS FOR NEUTRALIZING HYDROGEN SULFIDE DURING DRILLING

(71) Applicant: Saudi Arabian Oil Company, Dhahran (SA)

(72) Inventors: Ossama Sehsah, Dhahran (SA); Ihab Elhabrouk, Akrabiyah-Alkhobar (SA)

(73) Assignee: Saudi Arabian Oil Company, Dharan (SA)

( * ) Notice: Subject to any disclaimer, the term of this patent is extended or adjusted under 35 U.S.C. 154(b) by 0 days.

(21) Appl. No.: 15/260,387

(22) Filed: Sep. 9, 2016

(65) Prior Publication Data
US 2018/0072936 A1      Mar. 15, 2018

(51) Int. Cl.
E21B 21/06 (2006.01)
C09K 8/035 (2006.01)
C09K 8/532 (2006.01)

(52) U.S. Cl.
CPC .............. *C09K 8/035* (2013.01); *C09K 8/532* (2013.01); *E21B 21/062* (2013.01); *C09K 2208/20* (2013.01)

(58) Field of Classification Search
None
See application file for complete search history.

(56) References Cited

U.S. PATENT DOCUMENTS

| | | | |
|---|---|---|---|
| 3,301,323 A * | 1/1967 | Parsons | C09K 8/032 166/902 |
| 3,928,211 A | 12/1975 | Browning et al. | |
| 4,473,114 A | 9/1984 | Bell et al. | |
| 4,805,708 A * | 2/1989 | Matza | E21B 49/005 175/40 |
| 6,365,053 B1 | 4/2002 | Sunde et al. | |
| 7,231,976 B2 | 6/2007 | Berry et al. | |
| 7,704,299 B2 | 4/2010 | Mueller et al. | |
| 8,739,898 B2 | 6/2014 | Johnston et al. | |

(Continued)

FOREIGN PATENT DOCUMENTS

| WO | WO2014165140 A1 | 10/2014 |
|---|---|---|
| WO | WO2015050551 A1 | 4/2015 |

OTHER PUBLICATIONS

Bloys, Ben, et al. "Designing and managing drilling fluid." Oilfield Review 6.2 (1994): 33-43.

(Continued)

*Primary Examiner* — Angela M DiTrani Leff
(74) *Attorney, Agent, or Firm* — Bracewell LLP; Constance G. Rhebergen

(57) ABSTRACT

A method to neutralize hydrogen sulfide in a wellbore during drilling operations is provided. The method comprising the steps of mixing an amount of scavenger into a drilling mud to produce a scavenger-containing drilling mud such that the scavenger-containing drilling mud has a scavenging capacity, wherein the drilling mud is at a target pH, and introducing the scavenger-containing drilling mud into the wellbore during drilling operations, where the scavenger-containing drilling mud is operable to work with a drill bit to drill the wellbore, where the amount of scavenger in the scavenger-containing drilling mud is operable to irreversibly react with hydrogen sulfide present in the drilling mud to produce a scavenged hydrogen sulfide.

8 Claims, 2 Drawing Sheets

(56) References Cited

U.S. PATENT DOCUMENTS

| | | | |
|---|---|---|---|
| 2007/0019902 A1 | 1/2007 | Nakata et al. | |
| 2007/0199872 A1 | 8/2007 | Mueller et al. | |
| 2007/0253874 A1 | 11/2007 | Foret | |
| 2010/0163255 A1* | 7/2010 | Horton | B01D 53/1468 166/403 |
| 2014/0014589 A1 | 1/2014 | Niskakangas | |
| 2014/0128294 A1 | 5/2014 | Gatlin et al. | |
| 2014/0166361 A1* | 6/2014 | Jamison | E21B 21/065 175/24 |
| 2015/0000984 A1* | 1/2015 | McDaniel | E21B 21/06 175/64 |
| 2015/0226721 A1* | 8/2015 | Son | G01N 33/18 324/694 |

OTHER PUBLICATIONS

Mohamed Mahmoud Moussa, "New Techniques to Measure and Control Corrosion of Drilling Fluids and Elevated Temperature", University of Oklahoma PH.D. Thesis (1980) pp. 1-162.
Scott, Paul. "Drilling fluids with scavengers help control H [sub 2] S." Oil and Gas Journal; (United States) 92.21 (1994); pp. 1-4.
Wise, Wade, et al. "HP/HT Well: Fluid Selection, Planning and Lessons Learned" AADE-10-DF-HO-38 (2010). pp. 1-9.
PCT/US2017/050213 International Search Report and Written Opinion dated Nov. 16, 2017; 14 pgs.

\* cited by examiner

METHODS AND SYSTEMS FOR NEUTRALIZING HYDROGEN SULFIDE DURING DRILLING

BACKGROUND OF THE INVENTION

Field of the Invention

This invention relates to methods and systems for the removal of hydrogen sulfide. More specifically, the invention relates to methods and systems for the removal of hydrogen sulfide and that monitor hydrogen sulfide in the fluids.

Description of the Related Art

During drilling in a formation that has a high amount of hydrogen sulfide ($H_2S$), such a high $H_2S$ environment, $H_2S$ can be released at the surface causing problems to the surrounding environment and interrupting the drilling process. In addition, the release of $H_2S$ can negatively affect safety and performance. Current methods for removing $H_2S$ fail to monitor or control the concentration of $H_2S$ removal compounds opening up the risk that too little $H_2S$ removal compounds are added and thus allowing $H_2S$ to be released. In addition, many current hydrogen sulfide scavengers can harm the environment due the presence of harmful components, such as zinc. Other hydrogen sulfide scavengers can precipitate a residual that can cause formation damage, such as those that contain iron compounds.

SUMMARY OF THE INVENTION

This invention relates to methods and systems for the removal of hydrogen sulfide. More specifically, the invention relates to methods and systems for the removal of hydrogen sulfide and that monitor hydrogen sulfide in the fluids.

In a first aspect of the invention, a method to neutralize hydrogen sulfide in a wellbore during drilling operations is provided. The method includes the steps of mixing an amount of scavenger into a drilling mud to produce a scavenger-containing drilling mud such that the scavenger-containing drilling mud has a scavenging capacity, where the drilling mud is at a target pH, and introducing the scavenger-containing drilling mud into the wellbore during drilling operations, where the scavenger-containing drilling mud is operable to work with a drill bit to drill the wellbore, where the amount of scavenger in the scavenger-containing drilling mud is operable to irreversibly react with hydrogen sulfide present in the drilling mud to produce a scavenged hydrogen sulfide.

In certain aspects, the method further includes the step of adding pH buffer to the drilling mud before the step of mixing an amount of scavenger into a drilling mud such that the pH target of the scavenger-containing drilling mud is in a range between 10.5 and 11.0. In certain aspects, the amount of scavenger is in excess of 4 lb/bbl. In certain aspects, the scavenging capacity is between 800 mg/l and 1200 mg/l. In certain aspects, the method further includes the steps of monitoring the pH of the scavenger-containing mud, and adding additional pH buffer to the scavenger-containing mud to maintain a target pH between 10.5 and 11.0. In certain aspects, the pH is monitored every 30 minutes. In certain aspects, the pH is monitored with a pen-type pH monitor. In certain aspects, the scavenger is triazine. In certain aspects, the method further includes monitoring a scavenging capacity of the scavenger-containing mud; and adding an additional amount of scavenger if the scavenging capacity is below a depleted scavenger level.

In a second aspect of the invention, a method to neutralize hydrogen sulfide in a contaminated mud at a surface during drilling operations is provided. The method includes the steps of introducing the contaminated mud to a treatment loop, where the contaminated mud exits a wellbore prior to being introduced to the treatment loop. The treatment loop includes a pH buffer injection point, the pH buffer injection point configured to inject a pH buffer into the contaminated mud to produce a high pH mud at a target pH, a sample point, the sample point configured to measure the pH of the high pH mud, and a scavenger injection point, the scavenger injection point configured to inject an amount of scavenger. The method further includes the step of injecting pH buffer into the contaminated mud at the buffer injection point to produce the high pH mud, measuring the pH from the sample point, injecting the amount of scavenger into the high pH mud to produce a treated mud, introducing the treated mud into an agitator tank, the agitator tank configured to circulate the treated mud for a treatment time to produce a clean mud, and introducing the clean mud to a rig tank, the rig tank configured to supply the clean mud to the wellbore.

In certain aspects, the amount of scavenger is in excess of 4 lb/bbl. In certain aspects, the scavenging capacity is between 800 mg/l and 1200 mg/l. In certain aspects, the agitator tank includes an agitator, the agitator configured to create turbulence in the agitator tank, and a circulation pump, configured to withdraw a portion of the treated mud and return the withdrawn portion to the agitator tank. In certain aspects, the sample point includes a pH monitor. In certain aspects, the scavenger is triazine. In certain aspects, further includes the steps of monitoring a scavenging capacity in the treated mud, and adding an additional amount of scavenger at the scavenger injection point if the scavenging capacity is below a depleted scavenger level.

BRIEF DESCRIPTION OF THE DRAWINGS

These and other features, aspects, and advantages of the present invention will become better understood with regard to the following descriptions, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION OF THE INVENTION

While the invention will be described with several embodiments, it is understood that one of ordinary skill in the relevant art will appreciate that many examples, variations and alterations to the apparatus and methods described herein are within the scope and spirit of the invention. Accordingly, the exemplary embodiments of the invention described herein are set forth without any loss of generality, and without imposing limitations, on the claimed invention.

Advantageously, the present invention provides methods and systems for removing hydrogen sulfide from a drilling mud without the need to send the hydrogen sulfide gas exiting the well at the surface to a flare. The methods and systems of the present invention neutralize the hydrogen sulfide from the well. Hydrogen sulfide can be released from the formation into the well. Hydrogen sulfide released from the well can mix with the drilling mud that can be returned from the wellbore.

As used herein, "drilling mud" refers to any drilling fluid suitable for use in drilling the wellbore. The drilling mud can be an aqueous-based drilling mud. Where other terms are used to describe the drilling mud by the presence of sulfides, pH buffer, or scavenger, it should be understood that the "base" drilling mud remains the same, with the added components.

As used herein, "drilling operations" refers to the use of a drill and drill bit to drill a wellbore into a formation. The use of drilling operations encompasses all formation types, drills, rigs, and processes where hydrogen sulfide can be present in the return mud from the drill.

As used herein, "scavenging capacity" refers to the amount of sulfides that can be neutralized by the reaction between sulfides and scavenger to produce tied-up sulfides. Scavenging capacity is a measure of mass per unit volume of sulfides.

As used herein, "lime" refers to calcium hydroxide.

As used herein, "scavenge" refers to the ability of the scavenger to react with sulfides in the drilling mud.

Embodiments of the invention can include a method to neutralize hydrogen sulfide in a contaminated drilling mud at the surface during drilling operations. During the drilling of a well, a drilling mud can be injected into the wellbore to aid the drill bit in drilling the borehole. The drilling mud can become contaminated by hydrogen sulfide released from the formation.

Figure 1:
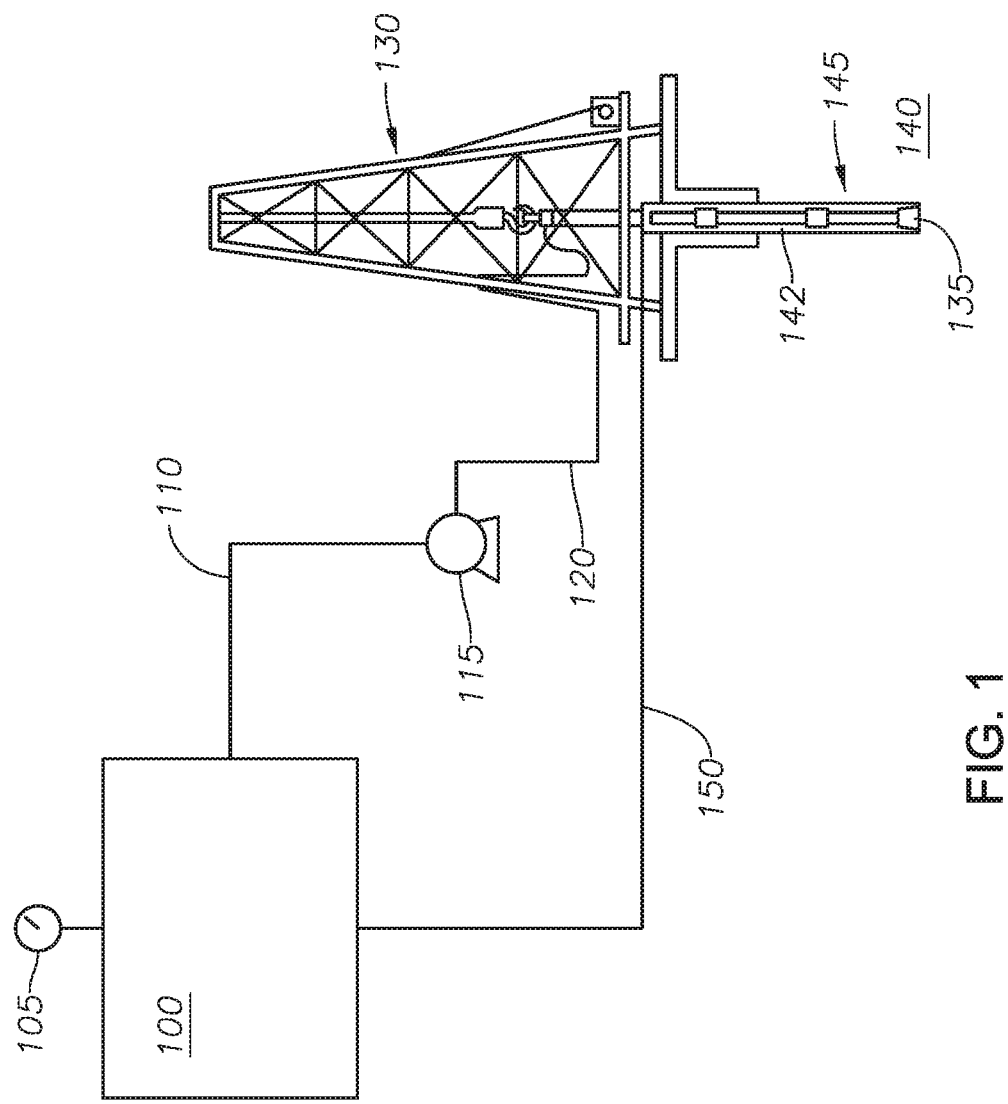
FIG. 1 is a schematic diagram of a system according to an embodiment of the invention.

Referring to FIG. 1, a method to neutralize hydrogen sulfide in a wellbore during drilling operations is provided. The figure and associated method is described with respect to both start-up mode and steady state operations. Unless otherwise indicated, the operating mode is steady state operations.

A pH buffer can be mixed with a drilling mud in rig tank 100. Rig tank 100 can be any vessel suitable for preparing a drilling mud, and alternately for holding a drilling mud as the source for drilling operations. In at least one embodiment, rig tank 100 is an open tank. In at least one embodiment, rig tank 100 is a conventional rig tank and can include instrumentation and other mechanical devices, such as shakers.

Rig pump 115 can be used to pump and circulate drilling mud from rig tank 100 into drill 135 or wellbore 145.

During start-up mode, the pH buffer is mixed with the drilling mud to increase the pH of the drilling mud to the target pH. During steady state operations, the pH buffer is mixed with the drilling mud to maintain the pH at the target pH. The target pH can be the same for both start-up mode and steady state operations. The target pH can be above 10, alternately above 10.5, and alternately between 10.5 and 11. Hydrogen sulfide can dissolve in drilling mud. The solubility of hydrogen sulfide in the drilling mud is inversely proportional to the pH. Advantageously, at a pH above 10, hydrogen sulfide dissolves in drilling mud and remains in solution. The hydrogen sulfide can produce soluble sulfide ions in the drilling mud. Without being bound to a particular theory, it is understood that molecular hydrogen sulfide ($H_2S$) can alternate between the gas phase and liquid phase depending on the pH of the carrying fluid. At high pH, such as pH above 10, the hydrogen sulfide can dissolve in the liquid phase and react with hydroxyl ions when dissolved, according to the following equation:

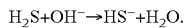

$$H_2S + OH^- \rightarrow HS^- + H_2O.$$

The resulting bisulfide ion (HS—) can remain in solution due to its negative charge.

By maintaining the hydrogen sulfide in solution, corrosion problems are minimized because there is no free hydrogen sulfide gas. In at least one embodiment of the present invention, hydrogen sulfide can stay dissolved in the drilling mud by maintaining a pH at or above 10.5 throughout the entire system.

The steps of increasing the pH of the drilling mud with the pH buffer and allowing the hydrogen sulfide to dissolve in the drilling mud are not alone sufficient to scavenge the hydrogen sulfide. In the absence of a scavenger, a reduction in pH below 10 can result in hydrogen sulfide gas being released from solution in the drilling mud.

The dissolved hydrogen sulfide can reduce the pH of the drilling mud. In at least one embodiment, an indication of the presence of hydrogen sulfide in return flow line 150 can be determined based on the amount of pH buffer mixed into rig tank 100.

The pH buffer can be selected from the group consisting of caustic soda, lime, monoethanolamine, and combinations thereof. Advantageously, and unlike caustic soda, lime can precipitate carbonates, which can form in the presence of carbon dioxide. The amount of pH buffer added in rig tank 100 is determined by the need to adjust or maintain the pH of the drilling mud.

The pH of the drilling mud can be measured by tank pH gauge 105. Tank pH gauge 105 can be any instrument capable of measuring the pH of the drilling mud in rig tank 100. In at least one embodiment tank pH gauge is any pH metering device. Tank pH gauge 105 provides a means to monitor the pH of the drilling mud over time. In at least one embodiment of the present invention, the pH of the drilling mud is measured at tank pH gauge 105 every 30 minutes using a pen-type pH meter. Adjustments to the quantity of pH buffer mixed into rig tank 100 can be made based on the pH measured by tank pH gauge 105.

During start-up mode, after the pH of the drilling mud is increased to the target pH, the scavenger is added to rig tank 100 to produce a scavenger-containing drilling mud. In at least one embodiment, the pH of the drilling mud is maintained at the target pH so that the scavenger can react with the soluble sulfide ions. In at least one embodiment, the drilling mud at the target pH can be circulated through the drill 135 and wellbore 145 while the scavenger is added to rig tank 100.

The scavenger can any chemical compound that irreversibly reacts with hydrogen sulfide. In at least one embodiment, the scavenger can be a liquid-based triazine. In at least one embodiment, the liquid-based triazine is (hexahydro-1,3,5-triazine-1,3,5-triyl)triethanol marketed under the trade name Mil-Gard® XPR by Baker Hughes®. In at least one embodiment, the liquid-based triazine is a hydroxylalkyl triazine marketed under the tradename Safe-Scav HS by M-I Swaco.

The scavenger reacts with the soluble sulfide ions in the drilling mud in an irreversible reaction to produce a tied-up sulfide. In at least one embodiment, the tied-up sulfide remains in solution even when the pH of the drilling mud is reduced below 10. The tied-up sulfide is soluble in the drilling mud regardless of pH. In at least one embodiment, the tied-up sulfide cannot be separated from the drilling mud. In at least one embodiment, where the scavenger is (hexahydro-1,3,5-triazine-1,3,5-triyl)triethanol, the tied-up sulfide is triathine, produced according to the following reaction:

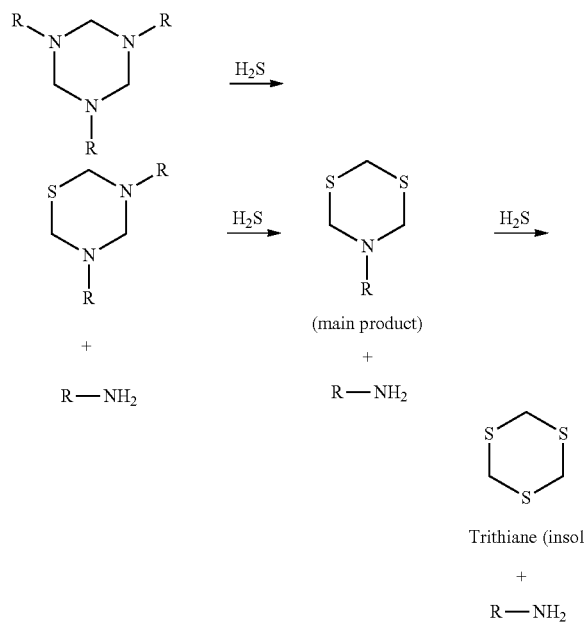

In at least one embodiment of the present invention, an amount of scavenger is added to rig tank 100. The amount of scavenger can be added in excess of the expected scavenging capacity needed. In at least one embodiment, the amount of scavenger added can be determined in consideration of the overbalance pressure exerted by the mud column on the formation and the concentration of hydrogen sulfide present in the formation. As used here, "the overbalance pressure" refers to when the pressure exerted by the drilling fluid on the formation is greater than the formation pressure, the difference is referred to as the overbalance pressure. In at least one embodiment, the scavenging capacity of the amount of scavenger is in excess of the scavenging capacity needed to convert all of the hydrogen sulfide tied-up sulfide. In at least one embodiment of the present invention, the amount of scavenger is greater than 4 lb/bbl, alternately greater than 5 lb/bbl, alternately less than 6 lb/bbl, and alternately between 4 lb/bbl and 6 lb/bbl. An amount of scavenger added to rig tank 100 between 4 lb/bbl and 6 lb/bbl provides a scavenging capacity between 800 mg/l and 1200 mg/l hydrogen sulfide in the scavenger-containing drilling mud. In at least one embodiment, the amount of scavenger is greater than the measured sulfides concentration.

The amount of scavenger can be tested at rig tank 100.

During steady state operations, the scavenging capacity in the scavenger-containing drilling mud can be determined with a Garrett Gas Train (GGT) instrument. A sample of the scavenger-containing drilling mud can be obtained from supply flow line 120. The sample is mixed with a known amount of sulfide to produce a known sulfide concentration, such that the known sulfide concentration is in excess of the suspected scavenging capacity so that the known amount of sulfide reacts with a portion of the amount of scavenger in the sample. Any remaining sulfides from the known amount of sulfide are measured by the GGT to determine the measured sulfides concentration. The GGT instrument measures the soluble sulfides in the sample to determine the measured sulfides concentration. The scavenging capacity of the scavenger-containing drilling mud is determined based on the following equation:

scavenging capacity=[known sulfide concentration]−[measured sulfides concentration]

As an example, a sample of a scavenger-containing drilling mud is mixed with a known amount of sulfides so that the known sulfide concentration is 1500 mg/L. A GGT is then run to determine that the measured sulfides concentration is 700 mg/L. The scavenging capacity is then 800 mg/L (1500 mg/L−700 mg/L=800 mg/L). To measure the scavenging capacity of the return mud, it is assumed that some of the soluble sulfides have been scavenged. A sample of the return mud is obtained. A known amount of sulfides are mixed with the sample of return mud to achieve a known sulfide concentration of 1500 mg/L in the sample of return mud. Then a GGT is run to determine that the measured sulfides concentration is 1200 mg/L. The scavenging capacity of the sample of return mud was 300 mg/L (1500 mg/L−1200 mg/L=300 mg/L).

During steady state operations, the amount of scavenger to be added to rig tank 100 is determined based on the scavenging capacity of the return mud in return flow line 150. The scavenging capacity can be determined based on a sample obtained from return flow line 150. In at least one embodiment, the scavenging capacity is determined using a Garrett Gas Train (GGT) instrument as described. If the GGT measures a detectable amount of soluble sulfides as a measured sulfides concentration, that indicates the depletion of the scavenger in the return mud. If depletion of the scavenger is indicated, then an amount of scavenger can be added to rig tank 100 determined by the scavenging capacity and the measured sulfides. In at least one embodiment, if the scavenging capacity in the return mud in return flow line 150 measures at a value lower than the scavenging capacity in the scavenger-containing drilling mud then an additional amount of scavenger is added in rig tank 100. In at least one embodiment, an amount of scavenger is added to rig tank 100 based on the measurements of the sample of return mud obtained from return flow line 150.

In at least one embodiment, the scavenging capacity is measured twice per day. In at least one embodiment, the scavenging capacity is measured as need to confirm scavenging capacity.

During start-up mode, after the target pH has been achieved and the desired scavenging capacity is achieved, the scavenger-containing drilling mud is allowed to flow from rig tank 100 through pump inlet 110 to rig pump 115. Drill 135 operates to form wellbore 145 in formation 140. The scavenger-containing drilling mud pumped through drill 135 performs as a drilling mud to maintain pressure in wellbore 145 and to sweep out drilling cuttings as drill 135 operates. In addition, the amount of scavenger in the scavenger-containing drilling mud reacts with hydrogen sulfide that mixes with the scavenger-containing drilling mud. In at least one embodiment, hydrogen sulfide is released form the formation.

The reaction between the scavenger and the hydrogen sulfide can occur at any point in the system provided the pH is maintained between 10.5 and 11.0. The reaction can occur at the bottom of wellbore 145, in annulus 142, in return flow line 150 and in rig tank 100. After reaction occurs, the scavenger-containing drilling mud also contains tied-up sulfides.

After exiting drill 135, the scavenger-containing drilling mud travels up annulus 142 and enters return flow line 150 as the return mud. The return mud flows into rig tank 100, where more pH buffer and scavenger can be added as needed or as determined by measurements of samples obtained from return flow line 150.

After the return mud flows at a steady rate, steady state operations is entered.

A method to neutralize hydrogen sulfide in a contaminated mud at a surface of a drilling site is provided. The contaminated mud from the wellbore is fed to a treatment loop where pH buffer is added to produce a high pH mud at the target pH. Once the target pH is reached, scavenger is added to the high pH mud to produce a treated mud. The amount of scavenger added is based on the measured sulfides concentration in the high pH mud. The treated mud is fed to at least one agitator tank where agitators and a circulating pump create turbulence in the agitator tanks. The turbulence enhances the reaction between the scavenger and the dissolved sulfides to produce tied-up sulfide. The reaction is enhanced because the turbulence creates better mixing, which increases the interaction between the sulfides and the scavenger. A scavenger sample point in the agitator tanks can be used to obtain a sample to measure a measured sulfides concentration and when below an acceptable limit, the treated mud exits the agitator tanks as a clean mud and flows to the rig tank to be used in the rig with the drill.

The method to neutralize hydrogen sulfide provides a controlled environment to neutralize hydrogen sulfide.

Figure 2:
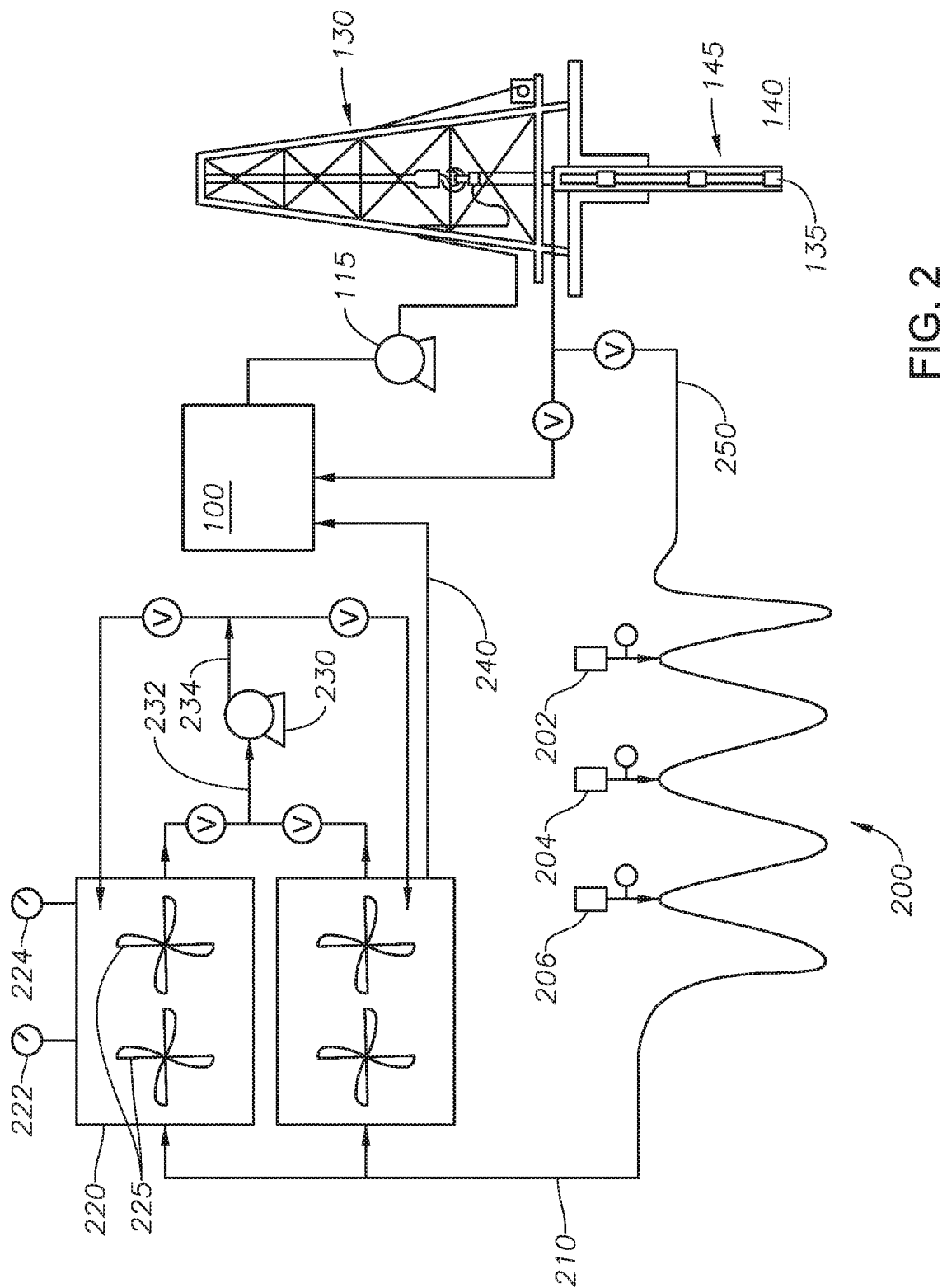
FIG. 2 is schematic diagram of a system according to an embodiment of the invention.

Referring to FIG. 2, a system to neutralize hydrogen sulfide in a contaminated mud at the surface of the drilling site during drilling operations is shown. A method to neutralize hydrogen sulfide in a contaminated mud at a surface during drilling operations is described with reference to FIG. 2.

A drilling mud is supplied to drill 135 from rig tank 100. Hydrogen sulfide present in wellbore 145 is carried from formation 140 by the drilling mud to produce a contaminated mud.

The contaminated mud with hydrogen sulfide is fed to treatment loop 200 through treatment line 250. Treatment loop 200 includes buffer injection point 202, sample point 204, and scavenger injection point 206. Treatment loop 200 is designed to allow for a retention time in treatment loop 200 of between 1 minute and 3 minutes, and alternately less than 5 minutes. As used herein, "designed" refers to pipe diameter, length, and configuration such that the desired parameter. In at least one embodiment, treatment loop 200 is secured by support skids (not shown).

Buffer injection point 202 can be any type of port capable of allowing the pH buffer to enter treatment loop 200. Buffer injection point 202 can include a reservoir (not shown) containing the pH buffer for injection, alternately, buffer injection point 202 can be connected to a pH buffer source by piping. The pH buffer is injected into the contaminated mud at buffer injection point 202 to produce a high pH mud.

Sample point 204 can be any type of port capable of allowing a sample to be drawn from treatment loop 200. In at least one embodiment, sample point 204 can include an instrument for measurement to allow real-time measurement of the high pH mud. In at least one embodiment, sample point 204 includes a pH meter. At sample point 204, the pH of the high pH mud is measured. If the pH is below the target pH, additional pH buffer is injected at buffer injection point 202. If additional pH buffer is injected, a second measure of pH is taken at sample point 204 to determine the pH of the high pH mud. The cycle of injecting additional pH buffer at buffer injection point 202 and measuring the pH at sample point 204 can continue until the target pH is reached. As described above with reference to FIG. 1, when the high pH mud reaches the target pH, hydrogen sulfide can dissolve into solution in the high pH mud. The measured sulfides concentration can be measured from the sample obtained from sample point 204

Scavenger injection point 206 can be any type of port capable of allowing the scavenger to enter treatment loop 200. Scavenger injection point 206 can include a reservoir (not shown) containing the scavenger for injection, alternately, scavenger injection point 206 can be connected to a scavenger source by piping. At scavenger injection point 206, an amount of scavenger is injected into the high pH mud to produce a treated mud.

The treated mud exits treatment loop 200 and flows to agitator tank 220 through treated mud line 210. Agitator tank 220 can include one or more tanks. Each agitator tank 220 includes at least one agitator 225. The treated mud flows into agitator tank 220, where agitators 225 create turbulence in agitator tank 220. The turbulence increases the mixing of the scavenger in the treated mud, which enhances the reaction between the scavenger and the hydrogen sulfide to produce tied-up sulfides.

In at least one embodiment, circulating pump 230 can be connected to agitator tank 220 to further mix the scavenger in agitator tanks 225. The treated mud is fed to circulating pump 230 through pump suction 232. The treated mud is returned to agitator tank 220 through a mixing hopper (not shown) and through pump outlet 234. As shown in FIG. 2, when two or more agitator tanks are used, valves (denoted by V in a circle) can be used to direct the flow around circulating pump 230 and agitator tanks 220. The flow rate through circulating pump 230 is based on the wellbore size and rate of cleaning as determined by best practices.

Each agitator tank 220 can include a buffer sample point 222 and a scavenger sample point 224. Buffer sample point 222 can be any type of instrument capable of measuring the pH of a fluid. If the pH, as measured at buffer sample point 222, is below the target pH, then additional pH buffer can be added at buffer injection point 202. Scavenger sample point 224 can be any type of port that allows a sample to be obtained from agitator tank 220. In at least one embodiment, the sample obtained from scavenger sample point 224 can be analyzed in a GGT instrument to measure the measured sulfides concentration and determine the scavenging capacity of the fluid in agitator tank 220.

Advantageously, the use of agitator tanks, agitators, and a circulation pump provides sufficient reaction time for the scavenger to neutralize the hydrogen sulfide.

When the measured sulfides concentration is less than 10 mg/L, or less than the allowed amount based on local regulations then the treated mud exits as clean mud through clean mud line 240 and flows to rig tank 100, where it can be used with rig 130 and drill 135.

The system to neutralize hydrogen sulfide at a drill site can also include flow meters, pressure sensors, and other instrumentation useful in monitoring a process. Advantageously, the system to neutralize hydrogen sulfide can provide continuous scavenging of hydrogen sulfide without having to stop drilling due to risk of hydrogen sulfide release. Advantageously, the system provides full control of the scavenging capacity of a drilling mud due to continuous measurement of the measure sulfides concentration in the drilling mud.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present invention.

What is claimed is:

1. A method to neutralize hydrogen sulfide in a wellbore during drilling operations, the method comprising the steps of:
   mixing an amount of scavenger into a drilling mud in a rig tank to produce a scavenger-containing drilling mud such that the scavenger-containing drilling mud has a scavenging capacity, wherein the drilling mud is at a target pH, wherein the drilling mud is an aqueous-based drilling mud;
   introducing the scavenger-containing drilling mud into the wellbore during drilling operations, where the scavenger-containing drilling mud is operable to work with a drill bit to drill the wellbore, where the amount of scavenger in the scavenger-containing drilling mud is operable to irreversibly react with hydrogen sulfide present in the scavenger-containing drilling mud to produce a scavenged hydrogen sulfide;
   determining a scavenging capacity of a return mud, wherein the return mud flows from the drill bit in the wellbore, comprising the steps of:
      collecting a sample of the return mud from a return flow line,
      mixing a known amount of sulfides in the sample to produce a known sulfide concentration in the sample, wherein the known amount of sulfide reacts with a portion of the scavenger in the sample to leave a remaining amount of sulfides,
      measuring the remaining amount of sulfides in the sample using a Garrett Gas Train instrument to produce a measured sulfides concentration, wherein the scavenging capacity is the known sulfide concentration minus the measured sulfides concentration; and
   adding an additional amount of scavenger to the rig tank when the scavenging capacity of the return mud is below a depleted scavenger level, wherein the depleted scavenger level occurs when the measured sulfides concentration indicates a detectable amount of soluble sulfides.

2. The method of claim 1, further comprising the step of adding pH buffer to the drilling mud before the step of mixing an amount of scavenger into a drilling mud such that the pH target of the scavenger-containing drilling mud is in a range between 10.5 and 11.0.

3. The method of claim 1, wherein the amount of scavenger is in excess of 4 lb/bbl.

4. The method of claim 1, wherein the scavenging capacity is between 800 mg/l and 1200 mg/l.

5. The method of claim 1, further comprising the steps of:
   monitoring the pH of the scavenger-containing drilling mud; and
   adding additional pH buffer to the scavenger-containing drilling mud to maintain a target pH between 10.5 and 11.0.

6. The method of claim 5, wherein the pH is monitored every 30 minutes.

7. The method of claim 5, wherein the pH is monitored with a pen-type pH monitor.

8. The method of claim 1, wherein the scavenger is triazine.

* * * * *